UNITED STATES PATENT OFFICE 2,609,336

AZEOTROPIC DISTILLATION OF PROPIONAMIDE

Walter M. Bruner, Wilmington, and Eugene Turner Darden, New Castle, Del., assignors to E. I. du Pont de Nemours & Company, Wilmington, Del., a corporation of Delaware No Drawing. Application August 25, 1950, Serial No. 181,556

10 Claims. (Cl. 202—42)

This invention relates to a method for purifying propionamide. More particularly, this invention relates to the separation of propionamide from mixtures thereof with contaminating substances, which mixtures are obtained in the synthesis of propionamide from propylene, ammonia, sulfur and water in accordance with the general method disclosed by Willgerodt (cf. also U. S. 2,495,567).

It is an object of this invention to provide a method for separating propionamide from substances which cannot readily be separated therefrom by ordinary distillation or crystallization procedures. Other subjects of the invention will appear hereinafter.

In accordance with this invention propionamide can be separated from the said contaminating substances by adding to the contaminated propionamide a hydrocarbon having a boiling point within the range of 153° to 273° C., preferably an alkane having from 10 to 12 carbon atoms per molecule, and distilling from the resulting mixture an azeotrope comprising propionamide and the said hydrocarbon.

The following table gives the boiling points of certain azeotropes produced in accordance with this invention.

TABLE I

Boiling points of azeotropes

| Azeotrope Components [1] | Boiling Points (C.°) at Various Pressures | | | |
|---|---|---|---|---|
| | Atmospheric | 200 mm. | 100 mm. | 50 mm. |
| n-decane+propionamide | 168 (11.8) | 126 (7.5) | 106 (5) | 88 (3) |
| n-undecane+propionamide | 183 (21) | 142 (17.3) | 123 (16) | 105 (15) |
| n-dodecane+propionamide | 193 (31.6) | 152 (26) | 132 (26) | 115 (26) |

[1] The approximate propionamide content of each azeotrope is given parenthetically.

The invention is illustrated further by means of the following examples.

Example 1.—A crude mixture containing propionamide, sulfur, sulfides, disulfides, mercaptans, unknown colored compounds inseparable from propionamide by ordinary distillation, oils, and tars is distilled in the presence of an excess of n-dodecane, giving rise to a minimum boiling azeotrope containing about 30% propionamide and 70% n-dodecane. The azeotrope boils at 115° C. at 50 mm. of mercury and 193° C. at 760 mm. On condensation, the azeotrope separates into two liquid phases, the lower layer being predominantly propionamide. This lower layer is cooled, and the propionamide crystals thus obtained are separated by filtration. This propionamide is white and free of sulfur and its compounds.

Example 2.—A crude mixture containing propionade, sulfur, sulfides, disulfides, mercaptans, unknown colored compounds inseparable from propionamide by ordinary distillation, oils, and tars is distilled in the presence of an excess of n-decane, giving rise to a minimum boiling azeotrope containing about 3% propionamide, and 97% n-decane. The azeotrope boils at 88° C. at 50 mm. pressure. On condensation, the azeotrope separates into two liquid phases, the lower layer being predominantly propionamide. The distillate is cooled with agitation, and propionamide crystals are separated by filtering the resulting slurry.

Example 3.—A crude mixture containing propionamide, sulfur, sulfides, disulfides, mercaptans, unknown colored compounds inseparable from propionamide by ordinary distillation, oils, and tars is distilled in the presence of an excess of n-undecane, giving rise to a minimum boiling azeotrope containing about 15% propionamide and 85% n-undecane. The azeotrope boils at 105° C. at 50 mm. pressure. On condensation the azeotrope separates into two liquid phases, the lower layer being predominantly propionamide. The distillate is cooled with agitation, and propionamide crystals are separated by filtering the resulting slurry. The crystals are washed free of n-undecane by means of low boiling alkanes.

Example 4.—A hydrocarbon mixture consisting predominantly of n-undecane and n-dodecane and obtained by distillation of "410 Thinner," a product of Shell Oil Co., was used as an azeotropic carrier to distill white and sulfur-free propionamide from a crude mixture containing oils, tars, sulfur compounds, etc. obtained in the synthesis of propionamide from propylene and aqueous ammonium polysulfide. The propionamide contents of the azeotropes recovered were between those of n-undecane and n-dodecane when the distillation was carried out at 50 mm. pressure. However, when the distillation was carried out at 200 mm. an azeotrope containing 31.4% propionamide was obtained at about 149° C. This is more than the amount of propionamide found in the $C_{11}$ or $C_{12}$ azeotropes at 142° C. and 152° C. respectively.

In the foregoing examples, the propionamide layer in the azeotropic distillates contains about 1% to 3% by weight of the hydrocarbon component. This may be removed by "topping" the lower layer, i. e. by separating the lower layer while the distillate is hot, and redistilling it to obtain a small amount of azeotrope as foreshot, and a residue of pure propionamide. Another way by which the hydrocarbon can be removed is to cool the propionamide phase and wash it while cold with low boiling alkanes, which removes the higher boiling hydrocarbon, as above illustrated. The low boiling alkanes can be removed from the crystals by evaporation.

It is to be understood that the foregoing examples are illustrative only and that numerous methods for practicing the invention will occur to those who are skilled in the art. For example, the azeotropic distillation may be carried out at various pressures, preferably within the range of about 50 to 760 mm. Since the azeotrope contains two liquid phases, separation of the lower layer containing predominantly propionamide, followed by redistillation thereof or extraction with a solvent which is non-miscible with the hydrocarbon component are examples of suitable procedures for separating the propionamide from the azeotrope.

The method of the invention is of course not limited to separation of propionamide from specific reaction mixtures but may be employed wherever it is desirable to remove propionamide from other substances which are not readily separated therefrom by simple distillation or crystallization.

We claim:

1. In a process for purifying propionamide the step which comprises distilling propionamide azeotropically with normal alkane having from 10 to 12 carbon atoms per molecule.

2. The process of claim 1 in which the said alkane is n-decane.

3. The process of claim 1 in which the said alkane is n-undecane.

4. The process of claim 1 in which the said alkane is a mixture of n-undecane and n-dodecane.

5. The process of claim 1 in which the said alkane is n-dodecane.

6. In a process for purifying propionamide the steps which comprise distilling propionamide with normal alkane having from 10 to 12 carbon atoms per molecule, whereby a two-phase azeotropic distillate is obtained, separating the said phases, conducting the propionamide phase to a still and distilling therefrom a propionamide-alkane azeotrope, whereby a residue of propionamide is obtained.

7. The process of claim 6 in which the said alkane is n-decane.

8. The process of claim 6 in which the said alkane is n-undecane.

9. The process of claim 6 in which the said alkane is a mixture of n-undecane and n-dodecane.

10. The process of claim 6 in which the said alkane is n-dodecane.

WALTER M. BRUNER.
E. TURNER DARDEN.

REFERENCES CITED

The following references are of record in the file of this patent:

UNITED STATES PATENTS

| Number | Name | Date |
| --- | --- | --- |
| 1,424,138 | Bailey | July 25, 1922 |
| 1,912,628 | Elliott | June 6, 1933 |
| 2,403,576 | Bradley | July 9, 1946 |

OTHER REFERENCES

Analytical Chemistry, vol. 19, August 1947, page 541, table of azeotropic data compiled by L. H. Horsley.